United States Patent [19]

Chan et al.

[11] Patent Number: 5,442,747
[45] Date of Patent: Aug. 15, 1995

[54] FLEXIBLE MULTIPORT MULTIFORMAT BURST BUFFER

[75] Inventors: Steven S. Chan, Fremont; Miles S. Simpson, San Jose; Scott A. Kimura, Saratoga, all of Calif.

[73] Assignee: AuraVision Corporation, Fremont, Calif.

[21] Appl. No.: 127,219

[22] Filed: Sep. 27, 1993

[51] Int. Cl.[6] .................................................. G06F 12/00
[52] U.S. Cl. ..................................... 395/164; 395/166; 365/189.04; 365/230.05
[58] Field of Search .............................. 395/164–166, 395/154, 400, 425, 250, 275; 365/189.01, 189.04, 189.05, 189.12, 230.02, 230.05, 230.08, 230.09

[56] References Cited

U.S. PATENT DOCUMENTS 5,157,775  10/1992  Sanger ........................... 364/DIG. 1
5,195,056   3/1993  Pinkham et al. ................ 365/189.05

Primary Examiner—Mark R. Powell
Assistant Examiner—Kee M. Tung
Attorney, Agent, or Firm—Skjerven, Morrill, MacPherson, Franklin & Friel; Brian D. Ogonowsky

[57] ABSTRACT

A multimedia video processor chip for a personal computer in employs a multi-port central cache memory to queue all the incoming data to be stored in a DRAM and all the outgoing data being retrieved from the DRAM. Such a cache memory is used in one of several modes in which the cache memory is partitioned by cache boundaries into different groups of storage areas. Each storage area of the cache is dedicated to storing data from a specific data source. The cache boundaries are chosen such that, for a given mode, the storage areas are optimized for worst case conditions for all data streams.

8 Claims, 6 Drawing Sheets

FLEXIBLE MULTIPORT MULTIFORMAT BURST BUFFER

BACKGROUND OF THE INVENTION

1. Field of the Invention

This invention relates to circuits for buffering multiple data streams. More particularly, this invention relates to a multiport, multiformat cache memory that queues incoming data to be stored in a DRAM and queues outgoing data retrieved from the DRAM.

2. Discussion of the Related Art

Multimedia applications for personal computers have proliferated in the last few years. Some multimedia applications require that a personal computer process data that represents text, graphics, still images, audio, and full-motion video. Video data requires high speed processing systems and a large frame buffer memory, usually a DRAM, to temporarily store the incoming video data prior to the data being displayed on a video screen or captured on a hard disk. In some high resolution video systems, a 4 megabyte DRAM is needed to store a single frame of video data.

FIG. 1A illustrates a typical multimedia application in which it is desirable that two asynchronous input data streams 102 and 104 be stored in a DRAM 108 to be retrieved for processing (e.g., display) at a later time. These two input data streams 102 and 104 (labeled as VIN1 and VIN2) are stored in DRAM 108 under control of a DRAM Control 106. At a later time, the data must be retrieved from DRAM 108 by DRAM Control 106 and supplied to either or both of output data terminals 110 and 112 (labelled as VOUT and CAP). VOUT may lead to circuitry for directly displaying the outputted data on a video screen, while CAP (capture) may lead to circuitry for storing the data on a hard disk.

Importantly, prior to storage in DRAM 108, it is usually necessary for the incoming data streams 102 and 104 to be buffered (i.e., queued) due to differences between the rates of the incoming data input streams and the rate at which the DRAM stores the two data streams. For example, since the DRAM may have only a single data input port, it may be desirable for the DRAM to store a block of data from one data stream at a time at a high burst rate, while additional data from the two data streams continue to be incoming. Buffering is typically performed using a number of First In - First Out (FIFO) memories, as shown in FIG. 1B. The reason for using FIFO's is to allow multiple sources to share a single DRAM. The FIFO's allow a continuous stream of data to be temporarily stored while another source accesses the DRAM. The FIFO's also increase the available bandwidth of the DRAM by allowing back-to-back cycles to be bursted (page mode). Finally, FIFO's allow asynchronous systems to communicate with one another.

In FIG. 1B, input data stream 102 (labelled as VIN1) is queued in a FIFO 114, controlled by Control 116, prior to being stored in DRAM 108, controlled by DRAM Control 106. FIFO 114 could be a fall-through type FIFO which successively moves a word through each register of the FIFO.

Input data stream 104 (labelled as VIN2) is queued by a FIFO 118, controlled by a Control 120, prior to being stored in DRAM 108.

Output data stream 110 (labelled VOUT) is queued by a FIFO 132, controlled by a Control 134, prior to being displayed on a video screen. And, output data stream 112 (labelled CAP) is queued by a FIFO 142, controlled by a Control 144, prior to being captured on a hard disk.

The prior art storage scheme illustrated by FIG. 1B has several disadvantages. For example, each FIFO 114, 118, 132 and 142 must be large enough in storage capacity to handle the longest (worst case) data burst anticipated for the data stream. For video applications, significant FIFO buffer sizes are required for each data stream in the system. This takes up valuable silicon real estate. Furthermore, the physical size of the data lines into and out of each of the FIFOs can be significant and in some cases redundant. Such data lines result in unnecessary congestion in the physical layout of the system. Finally, replication of FIFO control circuitry for each individual FIFO adds redundant elements to the overall system.

SUMMARY

A multimedia video chip for a personal computer or the like in accordance with this invention employs a single cache memory to queue a plurality of asynchronous data streams to be stored in a DRAM (or other memory) and retrieved from the DRAM. The cache has adjustable address boundaries to store data from a particular source into a designated queue area associated with that particular data source. The queue areas are sized differently for each operation mode of the system to accommodate the different buffering or queuing demands of the multiple data streams in the various operating modes.

In one embodiment, the cache memory can receive four separate data streams from four different sources and allocate each data stream to a designated queue area in the cache. The cache memory is used in one of several video operating modes, where each mode enables queuing of a different combination of the four data streams.

Cache boundary values are chosen for a particular mode such that each of the various queue area sizes are optimized for the anticipated worst case bursts or queuing requirements of the data streams when operating in the selected mode.

Using this system, multiple FIFO's, each being designed to handle a worst case data burst for its respective data stream, are not required, and a significant savings in the total memory size is achieved for the overall system.

This invention also results in significant savings in circuitry as well as physical routing area, since a single central cache is used.

In another embodiment of this invention, the cache memory is addressed using a set of linked lists so that buffer or queue areas may be dynamically re-allocated among data streams, depending on demand at any particular moment.

DESCRIPTION OF THE PREFERRED EMBODIMENTS

Figure 2:
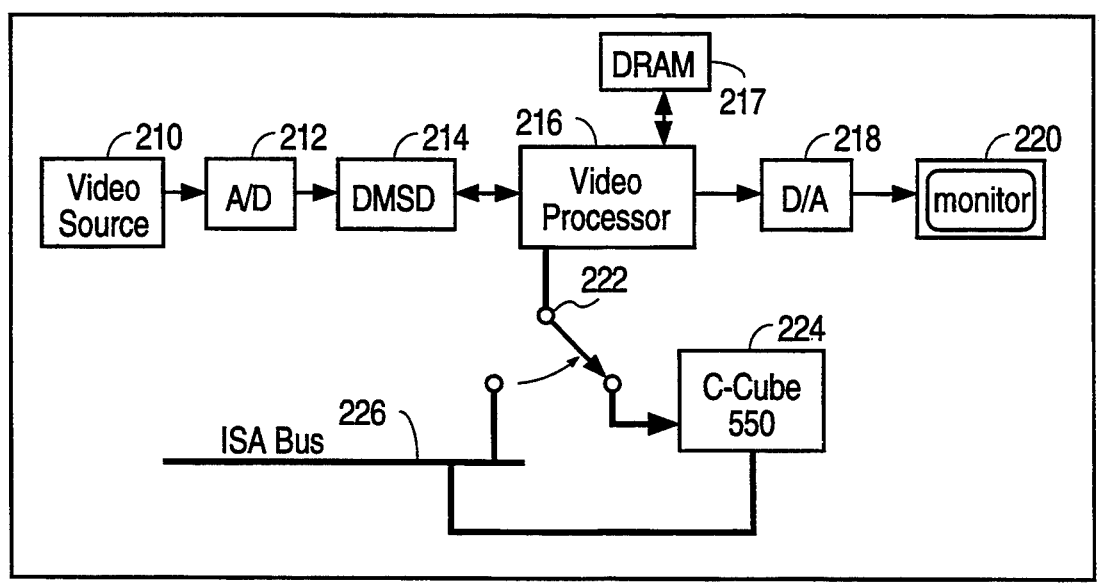
FIG. 2 illustrates a video processor, in accordance with this invention, being used in a specific application.

FIG. 2 illustrates a single chip multimedia video processor 216 in accordance with this invention being used in a specific application. Video source 210 (e.g., a camera) generates, for example, a standard television signal such as in the National Television System Committee (NTSC) format. Video source 210 is connected to an analog-to-digital (A/D) converter 212 which samples the television signal at a rate of, for example, 12 to 15 MHz. The digitized television signal is decoded by a digital multi-standard decoder (DMSD) 214, which may be a Phillips Semiconductor part number 7191 or 7151 described in "Desktop Video Data Handbook" by Signetics Company. However, decoder 214 may be any decoder that converts digital data from A/D converter 212 into a digital signal having a desired format (e.g., a YUV 4:2:2, YUV 4:2:1, or RGB 4:4:4 pixel format). The digital signal may be generated by any digital video source, such as an MPEG video decoder.

The data from decoder 214 is fed to a single-chip multimedia video processor 216. Video processor 216 is connected to a DRAM 217, which acts as a frame buffer for the data to be displayed on a video screen or stored on a hard disk. One output port of video processor 216 is connected by a digital-to-analog (D/A) converter 218 to a monitor 220.

Another input and output port of video processor 216 is connected via a switch 222 to an image compression/-decompression processor 224 or directly to a bus 226. Switch 222 is activated depending on whether processor 224 is needed for compression or decompression. Bus 226 is connected to various circuitry, including a hard drive for storing video data. Bus 226 is an Industry Standard Architecture (ISA) bus that interconnects several units in a personal computer, including the hard drive. Processor 224 may be a JPEG (Joint Photographic Expert Group) type processor such as the C-Cube CL550.

Although FIG. 2 shows an ISA bus architecture, other well known bus architectures may also be used.

Figure 3:
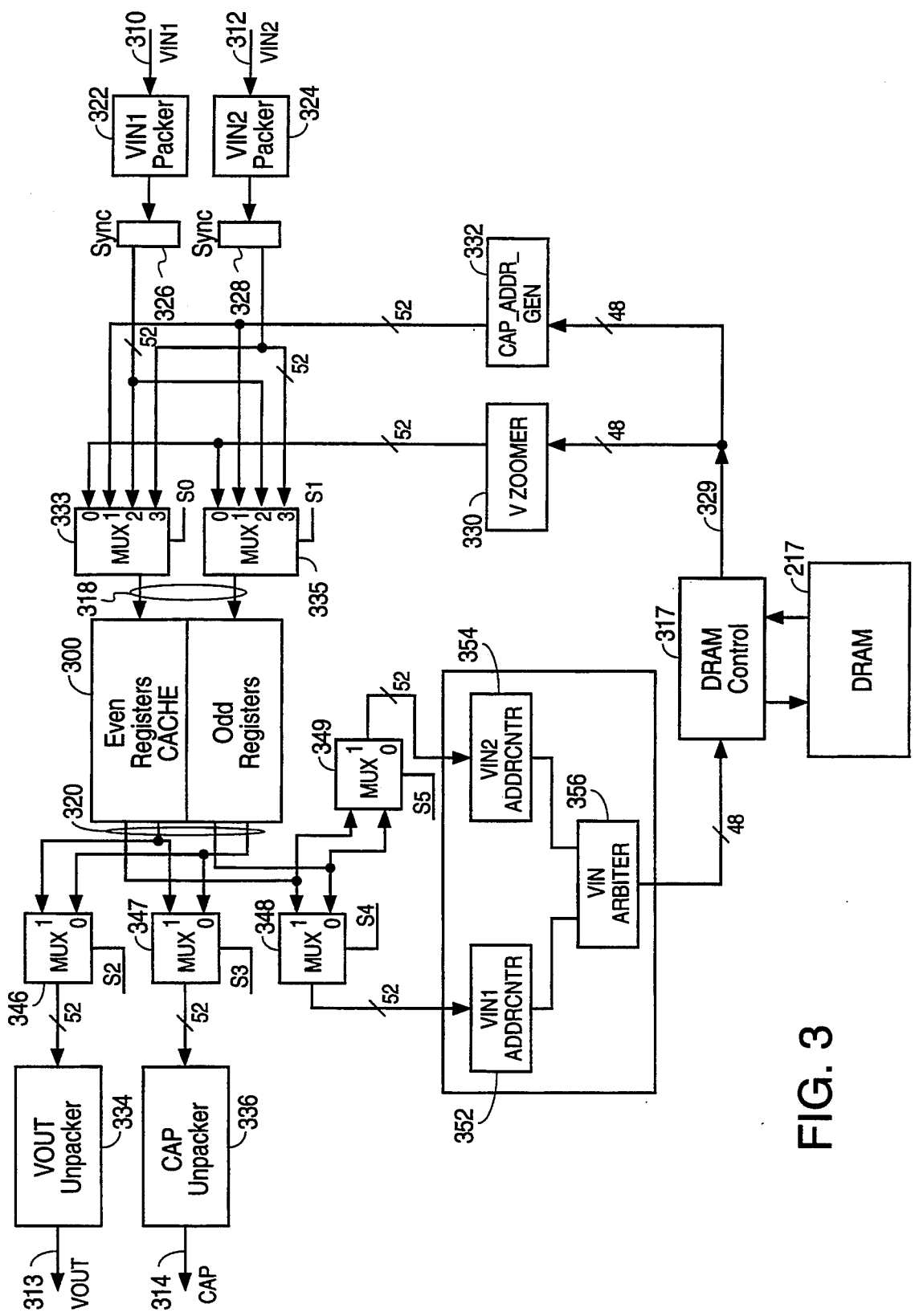
FIG. 3 is an illustrative block diagram of the control circuits, data paths, and cache buffer used by the video processor of FIG. 2 to queue multiple input data streams and output data streams.

FIG. 3 is an illustrative block diagram of the control circuits, data paths, and cache buffer 300 within video processor 216 (FIG. 2) used to queue input data streams 310 and 312 and output data streams 313 and 314 to be stored in and retrieved from DRAM 217 via a DRAM Control 317.

Figure 1A:
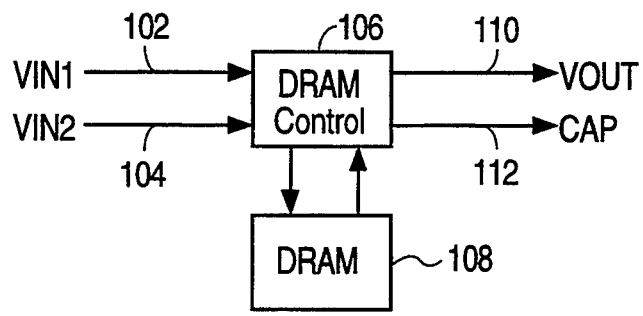
FIG. 1A illustrates a prior art memory system where two input data streams are to be stored in a DRAM to be retrieved for processing at a later time.
Figure 1B:
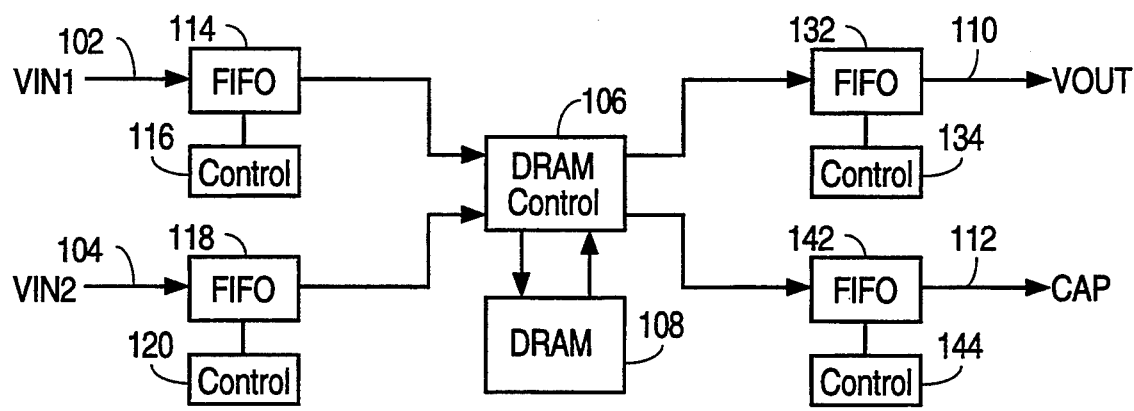
FIG. 1B illustrates a prior art memory system similar to that of FIG. 1A, but incorporating FIFO queuing.

In FIG. 3, all incoming data streams (VIN1, VIN2) from either video source 210 or bus 226 (FIG. 2) are queued by cache 300 before being temporarily stored in DRAM 217. Additionally, all output data streams (VOUT, CAP) for being displayed or for being stored on a hard disk are queued by cache 300 after being outputted by DRAM 217. As discussed above with reference to FIG. 1B, queuing of the data streams prior to storage in a DRAM and after being retrieved from a DRAM is necessary to enable the DRAM to store and retrieve data at a rate independent from the data rates of the incoming and outgoing data streams to and from video processor 216 (FIG. 2).

As seen in FIG. 3, no FIFO devices are used to queue the data. Instead, a single central cache 300 with input (write) ports 318 and output (read) ports 320 is employed to queue all data inputted to DRAM 217 or outputted from DRAM 217. Use of cache 300 to queue data streams results in significant savings in circuitry as well as physical routing area, since a single cache having variable internal boundary areas is used, as compared to the conventional design requiring multiple, "worst case" size FIFOs. Since the cache is a random access memory, the internal boundary areas (to be described in detail later) can be changed whenever a mode is changed.

Cache memory 300 is used in one of several modes depending on the functions to be supported by video processor 216. Three illustrative modes of cache memory 300 are described below with reference to FIGS. 6–8.

Input data streams 310 and 312 in FIG. 3 are streams of serial data which may be synchronous to each other but not synchronous with the cache and DRAM operations. These data streams are packed by VIN1 Packer 322 and VIN2 Packer 324, using well known methods, into a predetermined data unit size (e.g., 52 bits) and loaded into Sync Registers 326 and 328. The data in Sync Registers 326 and 328 is then outputted under control of a common clock to synchronize the outputted data with the cache 300 operation. The outputted data from Sync Registers 326 and 328 is then supplied to respective input ports of multiplexers 333 and 335.

Data outputted from DRAM 217 on lines 329 passes through VZOOMER 330 and $CAP_{13}ADDR\_GEN$ 332 and is applied to respective input ports of multiplexers 333 and 335. VZOOMER 330 is used to provide an address to DRAM Control 317 for retrieving VOUT data from DRAM 217. CAP_ADDR_GEN 332 is used to provide an address to DRAM Control 317 for retrieving CAP data from DRAM 217.

Control signals S0 and S1 applied to multiplexers 333 and 335 select one of the four data sources whose data is to be stored in cache 300.

The VIN1 and VIN2 data streams 310 and 312, after queuing by cache 300, are sent by cache 300 to DRAM 217 upon this data being addressed in cache 300. At the appropriate time, the data stored in DRAM 217 is sent via lines 329 to cache 300 for queuing before being applied to VOUT Unpacker 334 or CAP Unpacker 336. Thus, cache 300 queues all the incoming data and outgoing data. Addressing of cache 300 for storage or retrieval is discussed with reference to FIG. 4. Control signals S2 through S5 applied to multiplexers 346, 347, 348, and 349 select output data paths associated with either the even numbered registers in cache 300 or the odd numbered in cache 300 (to be described later with respect to FIGS. 5–8).

VIN1 and VIN2 queued data is transferred from cache 300 to DRAM Control 317 via VIN1 ADDR CNTR 352 and VIN2 ADDR CNTR 354, which are arbitrated by VIN ARBITER 356. Depth counters (not shown) in cache 300 detect the number of cache 300 reading and writing operations for VIN1 and VIN2 to determine the number of VIN1 and VIN2 data units stored in cache 300. The counts in these depth counters are compared by VIN1 ADDR CNTR 352 and VIN2 ADDR CNTR 354 to stored counts in VIN1 ADDR CNTR 352 and VIN2 ADDR CNTR 354, where the stored counts correspond to the space allocated in cache 300 for the VIN1 and VIN2 data. The difference between the depth counter counts and the stored counts is used by VIN ARBITER 356 to determine whether VIN1 or VIN2 data should be retrieved from cache 300 to make room for additional VIN1 or VIN2 data. The VIN ARBITER 356 then requests DRAM Control 317 to make a transfer of VIN1 or VIN2 data from cache 300 to DRAM 217. DRAM Control 317 also considers other demands on DRAM 217 to determine a priority operation of DRAM 217. The VIN1 ADDR CNTR 352 and VIN2 ADDR CNTR 354 also generate address signals for storing the VIN1 and VIN2 data in DRAM 217.

Figure 4:
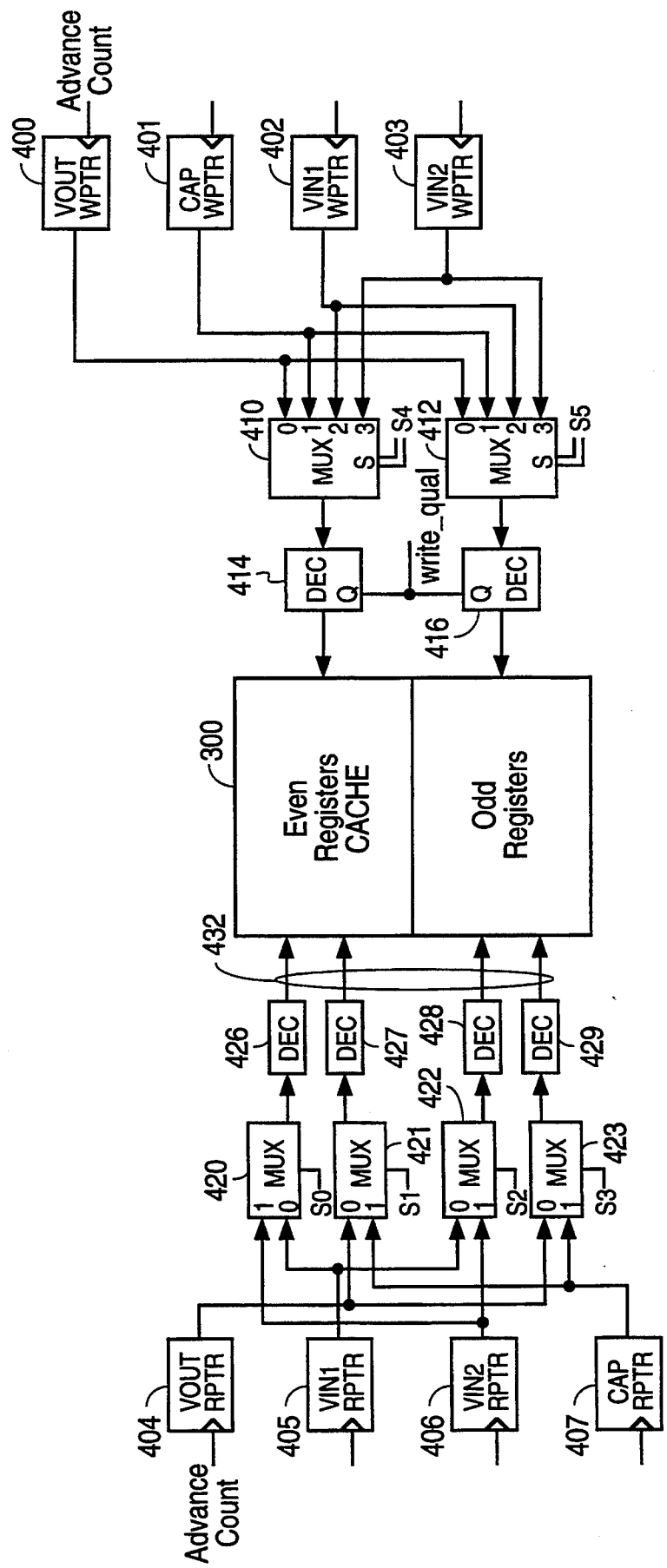
FIG. 4 is an illustrative block diagram of the address paths connected to the cache buffer of FIG. 3.

FIG. 4 is an illustrative block diagram of the address paths used by cache 300 in video processor 216. The various read and write pointers for the above-mentioned VIN1, VIN2, VOUT, and CAP data streams stored in cache 300 are identified as 400, 401, 402, 403, 404, 405, 406, and 407.

The write pointers 400-403 point to a next 6-bit address in cache 300 where the respective data from DRAM 217 (VOUT or CAP) or Packers 322 and 324 (VIN1 or VIN2) is to be written into. Only one of pointers 400-403 can address the even registers in cache 300 at a time, and only one of pointers 400-403 can address the odd registers at a time.

Multiplexers 410 and 412 are controlled by signals S4 and S5 to select an address input from one of write address pointers 400-403 when cache 300 is ready to store the respective data.

Decoders 414 and 416 decode an address designated by the write pointers 400-403 and address the proper location in cache 300 for storing the data.

For reading VIN1, VIN2, VOUT, and CAP data from cache 300, read address pointers 404-407 are provided. The pointers' 6-bit address signals are routed through multiplexers 420-423 and decoded by decoders 426-429 to read the respective data from cache 300. Since cache 300 has four read output ports 320 (FIG. 3) and four read address ports 432, the four read address pointers 404-407 can actively address cache 300 simultaneously as long as each pointer 404-407 provides address signals to a different one of address ports 432.

The VOUT and CAP data read from cache 300 is applied to VOUT Unpacker 334 and CAP Unpacker 336, respectively, in FIG. 3 to be, in turn, applied to external display or recording circuitry. The VIN1 and VIN2 data read from cache 300 is applied to DRAM 217 via VIN1 ADDR CNTR 352, VIN2 ADDR CNTR 354, VIN ARBITER 356 and DRAM control 317 in FIG. 3.

The various pointers, when enabled, are incremented in a ring fashion under control of an advance clock.

Control of multiplexers 410, 412, and 420-423 as well as enablement of the various pointers 400-407 is determined by depth counters (not shown) in cache 300 and other circuitry which determine the remaining space available in cache 300 for queuing data from the various data sources. Depth counters for the VIN1, VIN2, VOUT, and CAP data are decremented by an associated read pointer pop signal and incremented by an associated write pointer push signal to determine the number of data units of that type stored in cache 300. This count is then used to determine whether data should be retrieved from or stored in cache 300. For example, if a depth counter output shows a certain excess of cache 300 write operations over read operations for a VIN1 data stream, it is then determined that VIN1 data must be read out of cache 300 to make room for additional incoming VIN1 data. This enables the system to determine when cache 300 is available to receive additional data from DRAM 217 (VOUT or CAP), VIN1 Packer 322, or VIN2 Packer 324 and when cache must output data to DRAM 217, VOUT Unpacker 334, or CAP Unpacker 336 to make room for incoming data.

Enable signals from DRAM Control 317 are also detected by the VOUT and CAP write pointers 400 and 401 as well as the VIN1 and VIN2 read pointers 405 and 406 to indicate that the DRAM 217 is ready to output or receive data.

Importantly, any VIN1 and VIN2 data must be first queued by cache 300, then stored in DRAM 217, then outputted by DRAM 217 into cache 300 before the data can be outputted by cache 300 as either the VOUT or CAP data streams.

The VIN1, VIN2, VOUT, and CAP data retrieved from cache 300 is directed to the proper one of two read output ports 320 (FIG. 3) for the even registers and two read output ports 320 for the odd registers by cache 300 after cache 300 receives an appropriate VIN1, VIN2, VOUT, or CAP Initiate Read Signal and a read pointer address is applied to the proper read address input port shown in FIG. 4.

Figure 5:
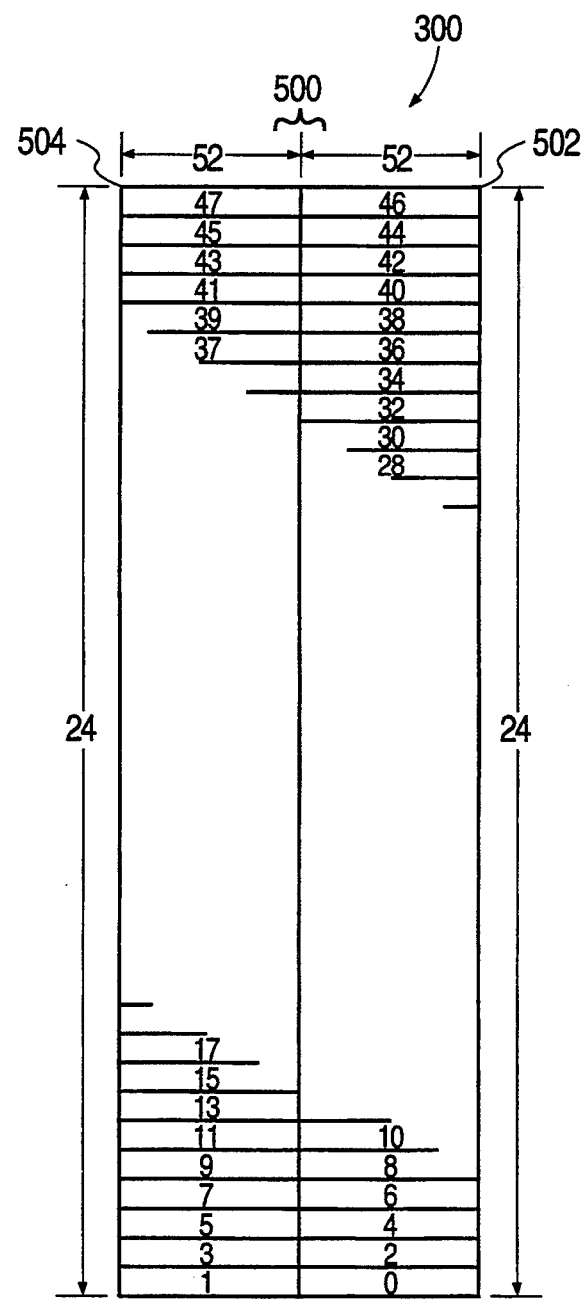
FIG. 5 is an illustrative diagram of the internal addressing scheme of the cache buffer.

FIG. 5 is an illustrative diagram of the internal addressing scheme of cache 300. Cache 300 may be used in one of several modes depending on the functions to be supported by video processor 216. In each of these several modes, cache 300 is divided into a different combination of queue areas, where each queue area is dedicated to storing data from a specific data source, such as VIN1 (from VIN1 Packer 322), VIN2 (from VIN2 Packer 324), VOUT (from VZOOMER 330), or CAP (from CAP_ADDR-GEN 332).

As shown in FIG. 5, forty eight registers 500, in one embodiment, are organized together to form the memory portion of cache 300. Each of registers 500 is 52 bits wide. Registers 500 that have even numbered addresses are organized into a register file 502, and registers 500 that have odd numbered addresses are organized into another register file 504. Register addresses for reading or writing data are designated by the respective read and write pointers 400-407 shown in FIG. 4.

Figure 6:
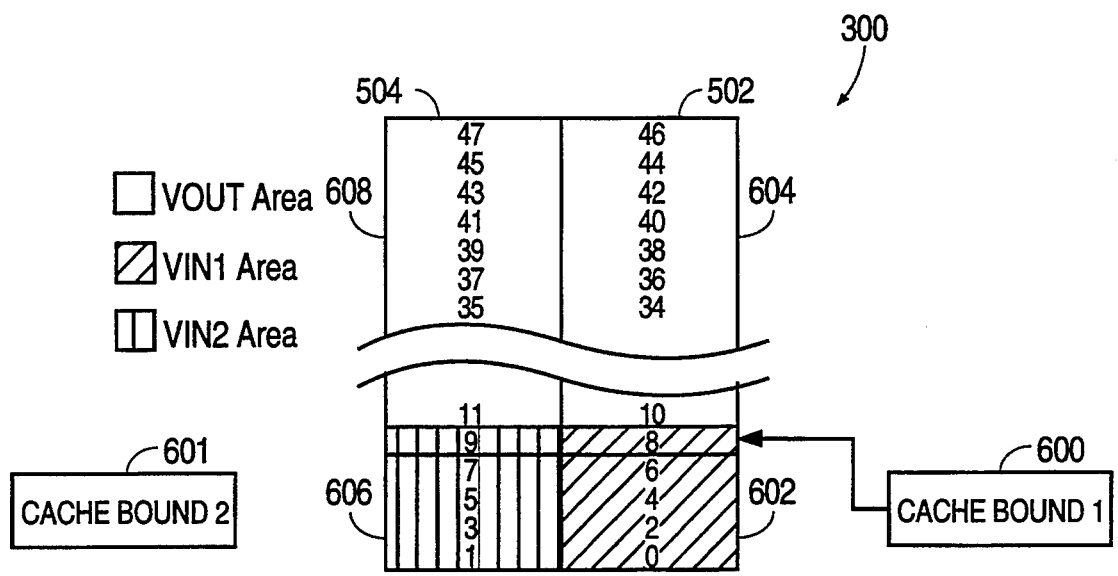
FIGS. 6, 7, and 8 illustrate the use of the cache buffer in various modes.

FIG. 6 illustrates the division of register files 502 and 504 in cache 300 in the mode referred to as VIN1-VIN2-VOUT. This particular mode shown in FIG. 6 corresponds to a mode in which two input streams of interlaced frame data (VIN1 stream 310 and VIN2 stream 312 in FIG. 3) are to be stored in DRAM 217. For example, the VIN1 stream 310 may be the original image data, transmitted line-by-line, while the VIN2 stream may be interpolated image data which is interpolated from a current line and a previous line of VIN1 image data. The resulting VOUT data from DRAM 217 will then be non-interlaced image data incorporating the original VIN1 data and the interpolated VIN2 data.

Register files 502 and 504 of cache 300 are shown in FIG. 6 as being divided into three different queue areas in accordance with certain values stored in cache boundary register 600. Register 600 may be a six bit register. A second cache boundary register 601 is shown but is not used in this particular mode. The values in cache boundary register 600 are used to effectively preset the upper and lower boundaries of the enabled read and write pointers in FIG. 4 and dictate the bounds of the queuing area where the pointers will traverse.

Register file 502 is divided by the values written into cache boundary register 600 into VIN1 queue area 602 (addresses 0, 2, 4, 6, and 8) and VOUT queue area 604 (addresses 10, 12, . . . 44 and 46). Similarly, register file 504 is divided by cache boundary register 600 into VIN2 queue area 606 (addresses 1, 3, 5, 7, and 9) and VOUT queue area 608 (addresses 11, 13, . . . 45 and 47). VOUT queue areas 604 and 608 form one contiguous queue area of even and odd registers which are addressed in sequence and in a ring fashion (i.e., 10, 11, . . ., 46, 47, 10 . . .).

The values written into cache boundary register 600 are selected any time prior to an operation such that, for the particular mode of FIG. 6, the queue areas 602, 604, 606, and 608 are optimally sized to buffer the data streams VIN1, VIN2 and VOUT in that mode. Therefore, a significant savings in memory size is achieved over prior art buffer or queue memories which have fixed-sized areas dedicated to each data source, where those fixed areas must handle the worst case data bursts for any mode of operation.

For operation in the mode illustrated in FIG. 6, the cache boundary register 600 is initially loaded with the proper values corresponding to the desired mode. The values in register 600 are used to control conventional logic to cause the following to occur: preset the VIN1 read and write pointers 405 and 402 to be restricted to the addresses 0–8 and set the least significant bit (LSB) of the pointers to be zero so that the pointers effectively count only even addresses; preset the VIN2 read and write pointers 406 and 403 to be restricted to the addresses 1–9 and set the LSB of the pointers to one to count only odd addresses; and preset the VOUT read and write pointers 404 and 400 to be restricted to the addresses 10–47. The LSB of the address code (identifying an even or odd address) outputted by a pointer controls multiplexers 346, 347, 348, and 349 to select the data path from either the even registers 502 or the odd registers 504.

Thus, data units from VIN1 stream 310 and VIN2 stream 312 in FIG. 3 are sequentially stored in VIN1 queue area 602 and VIN2 queue area 606, respectively, by incrementing the respective write pointers 402 and 403 (FIG. 4) and controlling multiplexers 410 and 412 to select the proper pointer inputs. Reading from cache 300 is conducted for VIN1 and VIN2 data by incrementing read pointers 405 and 406 and appropriately controlling multiplexers 420 and 422 to select the proper pointer inputs. The data paths of the VIN1 and VIN2 data into and out of the addressed cache locations is similarly accomplished by the appropriate control of the data multiplexers shown in FIG. 3.

VOUT data units are sequentially stored in VOUT queue areas 604 and 608 by incrementing VOUT write pointer 400 in FIG. 4 and properly controlling multiplexers 410 and 412, while VOUT data units to be sent out from cache 300 are sequentially read out by incrementing VOUT read pointer 404 and properly controlling multiplexers 421 and 423.

Figure 7:
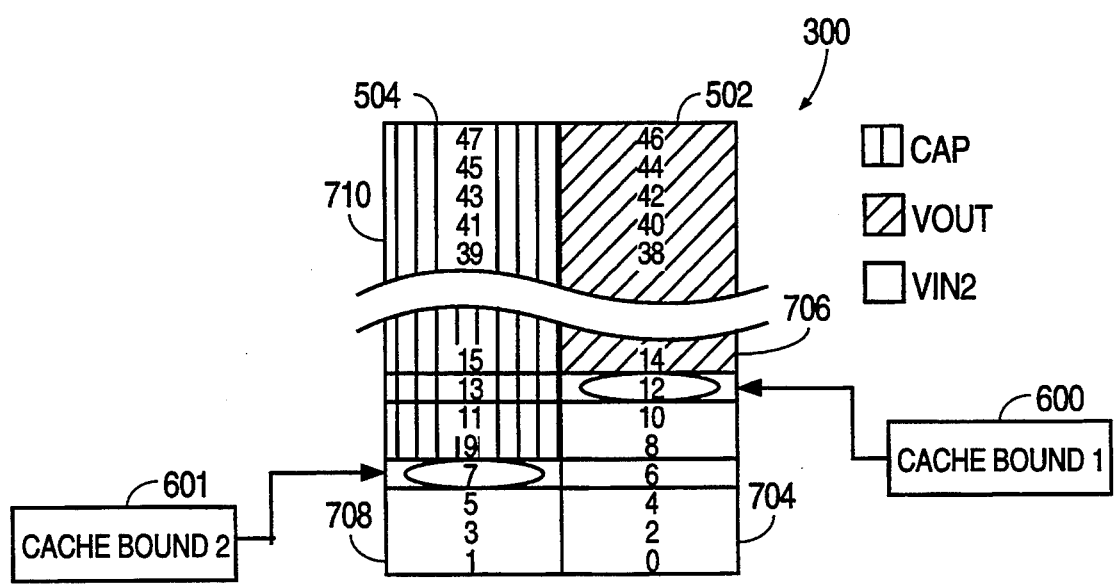

FIG. 7 illustrates the use of cache 300 in the mode VIN2-VOUT-CAP. This mode of FIG. 7 corresponds to a mode in which cache 300 buffers a single stream of input data (VIN2) and two streams of data (VOUT and CAP) outputted from DRAM 217 in FIG. 3.

As shown in FIG. 7, cache 300 is divided in accordance with the values loaded into cache boundary registers 600 and 601 into different queue areas. Register file 502 is divided by cache boundary register 600 into VIN2 queue area 704 and VOUT queue area 706. Similarly, register file 504 is divided by cache boundary register 601 into VIN2 queue area 708 and CAP queue area 710. Read and write pointers are restricted to the ranges corresponding to each of queue areas 704, 706, 708, and 710.

The selection of the particular mode shown in FIG. 7 requires the various multiplexers in FIGS. 3 and 4 to be controlled to select the proper read and write pointers as well as to select whether the outputted data is originating from the even registers 502 or the odd registers 504. Cache boundary registers 600 and 601 are loaded with the required values prior to operation such that for this particular mode, the queue areas are optimally sized for the worst case conditions for all data streams VIN2, VOUT and CAP. A user may select the particular values to write into the cache boundary registers based on his or her particular needs.

During operation in the mode shown in FIG. 7, the LSB of the enabled read and write pointers is set to cause the pointers to only sequentially address the even or odd addresses, and the boundaries of the pointers are set to only read and write data from/to a designated queue area. In the mode shown in FIG. 7, the VIN2 write pointer may be controlled to first sequentially store data in even registers 502 then store data in odd registers 504. The addressing is performed in a ring fashion (e.g., 0, 2, . . ., 12, 1, 3, 5, 7, 0, 2 . . .).

Figure 8:
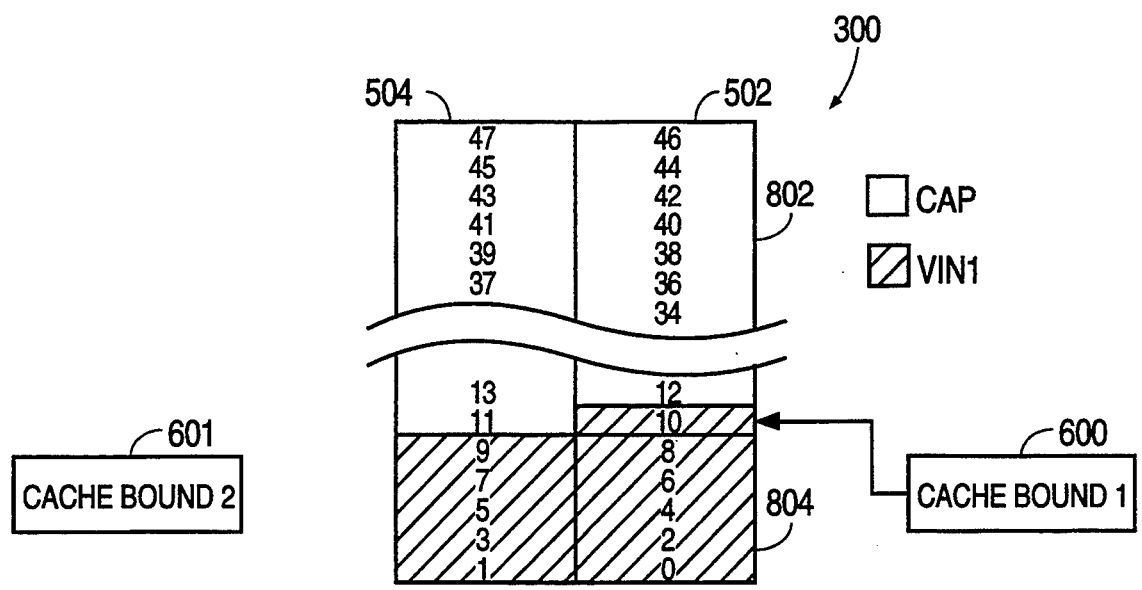

FIG. 8 illustrates the use of cache 300 in the mode VIN1-CAP. This mode corresponds to where the original input data (VIN1) is to be queued and ultimately captured by a hard disk without being displayed. As shown in FIG. 8, cache 300 is divided in accordance with the values loaded into cache boundary register 600 into two queue areas: CAP queue area 802 and VIN1 queue area 804. The values are written into cache boundary register 600 prior to operation such that, for this mode, the queue areas 802 and 804 are optimized for the worst case conditions for both data streams CAP and VIN1. Data reading and writing operations are similar to those described with respect to FIGS. 6 and 7.

A mode is chosen in the preferred embodiment by selecting which data streams are enabled and disabled. Once the data streams are selected, the appropriate enable/disable bits are stored in registers, not shown. Simple logic circuitry or software is used to then write the appropriate preset values into cache boundary registers 600 and 601 and set up the cache 300 boundaries. The mode chosen also causes the logic to determine whether the values in cache boundary register 600 select a nonsymmetrical queue area, as shown in FIG. 8, or select symmetrical queue areas, as shown in FIG. 6, by either ignoring or taking into account the LSB in the cache boundary register 600.

Any size combination of up to four separate buffer areas in cache 300 may be selected using the above preferred embodiment system by setting the proper values in the cache boundary registers. The designation of any number of queue areas would also be possible. It would be readily understood by those skilled in the art how to design a simple logic device to decode the values in the various cache boundary registers and control the various address and data path components as described above.

If less cache throughput were tolerable, the multiplexer scheme in FIGS. 3 and 4 could be simplified by creating cache 300 to have only a single serial string of registers rather than even and odd registers. This would also simplify the logic used to divide up the cache into queue areas. Such a simplification would be easily implemented by those skilled in the art. Further, additional register files may be added if required to meet the demands of a higher throughput system.

The description of the embodiments of this invention is intended to be illustrative and not limiting. Numerous modifications and variations of this invention will be apparent to those skilled in the art.

We claim:

1. A video image memory system comprising:
    a buffer memory having at least one input data port for accepting incoming data to be stored in said buffer memory, at least one write address port for receiving addresses designating locations where said incoming data is to be stored in said buffer memory, at least one output data port for outputting data retrieved from said buffer memory, and at least one read address port for receiving addresses designating locations of stored data in said buffer memory to be outputted,
    each of said locations corresponding to one of a plurality of storage registers in said buffer memory;
    a plurality of data sources connected to said at least one input data port for generating data to be buffered by said buffer memory;
    a read addressing means for each of said data sources, each of said read addressing means being connected to said at least one read address port for generating an address for retrieving data associated with each of said data sources from said buffer memory;
    a write addressing means for each of said data sources, each of said write addressing means being connected to said at least one write address port for generating an address for storing data associated with each of said data sources into said buffer memory; and
    a boundary control circuit connected to said buffer memory for allocating a different group of said registers in said buffer memory to buffer data from different ones of said data sources such that each group of registers only contains data from a single one of said data sources, said boundary control circuit selecting a size of each group of registers depending upon a particular mode of operation selected for said video image memory system, said mode being selected based on requirements of said buffer memory to buffer said data from said data sources,
    said boundary control circuit being connected to control each of said read addressing means and each of said write addressing means to selectively address only those registers in a designated group of registers, each group of registers being designated to store data from only a single data source.

2. The system of claim 1 further comprising
    a first multiplexer means having two or more data receiving ports, each data receiving port for receiving data from a different one of said plurality of data sources, said first multiplexer means having a control terminal connected to receive a signal designating which one of said data receiving ports to connect to a first multiplexer output port, said first multiplexer output port being connected to one of said at least one input data port of said buffer memory.

3. The system of claim 2 further comprising a second multiplexer means having two or more address receiving ports, each address receiving port for receiving an address from a different one of said write addressing means, said second multiplexer means having a control terminal connected to receive a signal designating which of said address receiving ports to connect to a second multiplexer output port, said second multiplexer output port being connected to one of said at least one write address port of said buffer memory.

4. The system of claim 1 further comprising a dynamic random access memory (DRAM) having an input connected to receive data outputted from said at least one output data port of said buffer memory.

5. The system of claim 1 wherein said boundary control circuit controls said read addressing means and said write addressing means to only generate addresses within said designated group of registers, said read addressing means and said write addressing means being incremented upon application of a clock signal to said read addressing means and said write addressing means.

6. The system of claim 1 wherein said boundary control circuit comprises one or more cache boundary registers which are loaded with preset values associated with said particular mode of operation being selected, said preset values providing control signals for controlling said boundary control circuit to allocate a different group of said registers in said buffer memory to buffer data from different ones of said data sources.

7. A method of operating a system for buffering data to be stored in and retrieve from a video memory, said method comprising the steps of:
    selecting one or more data streams from a set of data streams to be buffered by a buffer memory; and
    allocating a different group of registers in said buffer memory to buffer data from different ones of said data streams which have been selected, such that each group of registers only contains data from a single one of said data streams, a size of each group of registers depending upon a particular mode of operation selected for said system, said mode being selected based on requirements of said buffer memory to buffer data from said data streams selected.

8. The method of claim 7 wherein said step of allocating comprises the step of controlling read addressing means associated with each of said data streams selected and write addressing means associated with each of said data streams selected to selectively address only those registers in a designated group of said registers in said buffer memory, each group of registers being designated to store data from only a single one of said data streams.

* * * * *